(12) United States Patent
Payne et al.

(10) Patent No.: US 6,965,498 B2
(45) Date of Patent: *Nov. 15, 2005

(54) AIR-BEARING SLIDERS HAVING LEADING READ/WRITE HEAD AND FLYING WITH NEGATIVE PITCH

(75) Inventors: Robert N. Payne, San Jose, CA (US); Francis C. Lee, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 31 days.

This patent is subject to a terminal disclaimer.

(21) Appl. No.: 10/742,660

(22) Filed: Dec. 18, 2003

(65) Prior Publication Data

US 2004/0130822 A1 Jul. 8, 2004

Related U.S. Application Data

(63) Continuation of application No. 09/920,272, filed on Jul. 31, 2001, now Pat. No. 6,751,063.

(51) Int. Cl.[7] .............................................. G11B 5/60
(52) U.S. Cl. ............................... 360/234.7; 360/236.3; 360/237
(58) Field of Search ................ 360/234.3, 235.4–237.1

(56) References Cited

U.S. PATENT DOCUMENTS 5,822,153 A * 10/1998 Lairson et al. ........... 360/234.7
6,040,959 A * 3/2000 Kobayashi et al. ....... 360/236.7

* cited by examiner

*Primary Examiner*—A. J. Heinz
(74) *Attorney, Agent, or Firm*—Lumen IP Services, Inc.; Thomas R. Berthold

(57) ABSTRACT

The present invention is directed towards air-bearing sliders that are used in disk drives. The invention involves pitching a slider so that the leading portion of the slider is closer to the disk than the trailing portion of the slider. The negative pitch reduces the sensitivity of the slider to ambient air pressure, radial position, and to data accessing over the disk. When used in combination with a reverse-flow disk drive, negatively pitched sliders facilitate the routing of traces to the head.

3 Claims, 8 Drawing Sheets

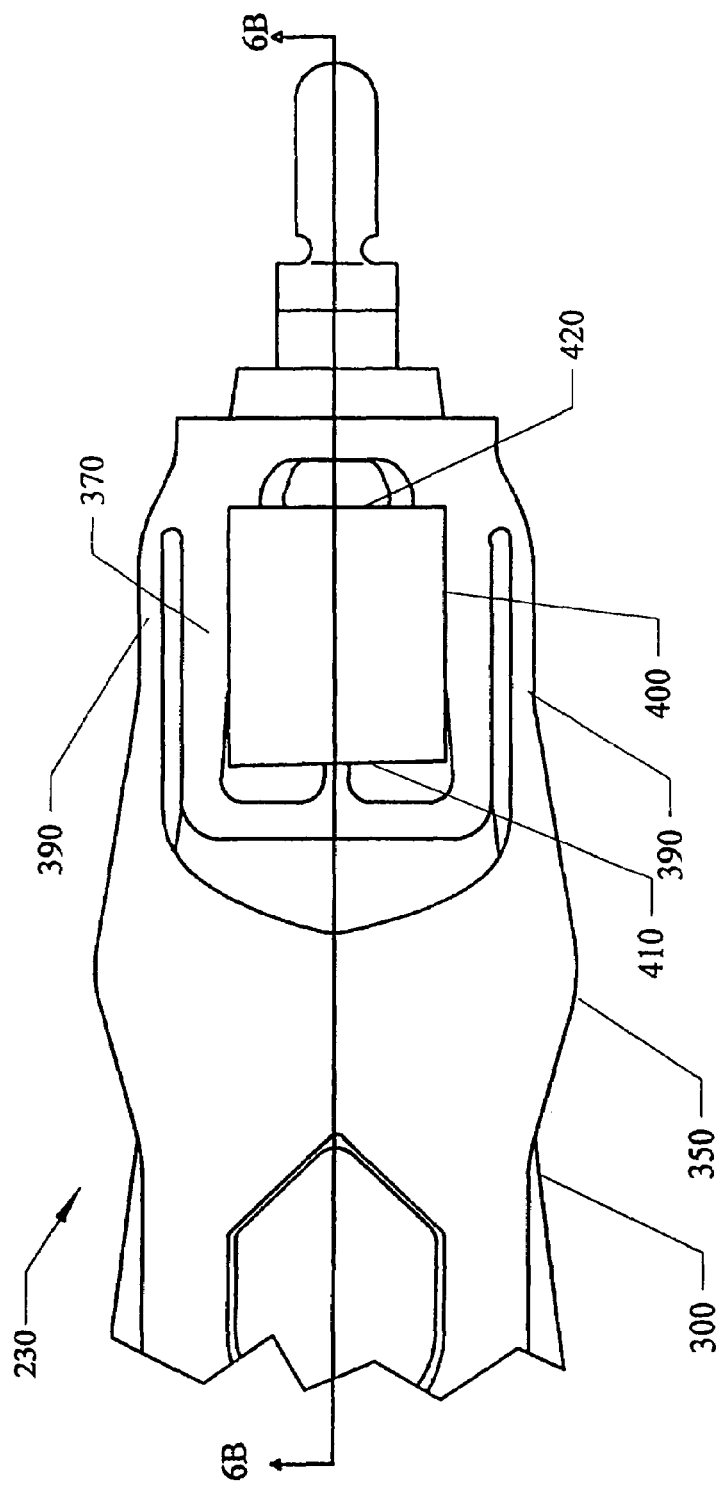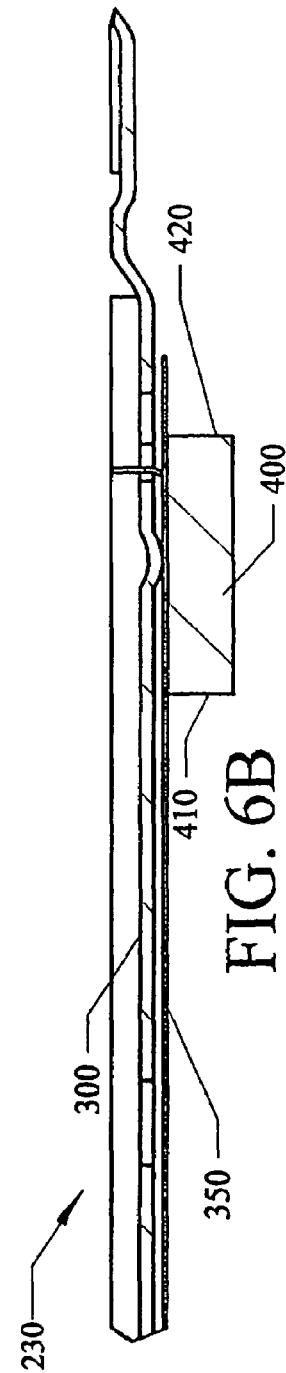

AIR-BEARING SLIDERS HAVING LEADING READ/WRITE HEAD AND FLYING WITH NEGATIVE PITCH

CROSS REFERENCE TO RELATED APPLICATIONS

This application is a continuation of application Ser. No. 09/920,272 filed Jul. 31, 2001 now U.S. Pat. No. 6,751,063.

FIELD OF THE INVENTION

The present invention relates to air-bearing sliders used in disk drives. In particular, it relates to air-bearing sliders that are negatively pitched relative to the disk.

BACKGROUND OF THE INVENTION

Disk drives are data storage devices that are routinely used with computers and other data processors. In a disk drive, the transducer element, commonly referred to as the head, reads and/or writes data from a spinning data-storage medium, or disk. The head is typically formed as part of an air bearing slider that is fixed to a suspension. The suspension helps to damp vibrations and keep the slider and its head steady. With reference to FIG. 1, the suspension 230 is attached to an actuator arm 210. The entire head-carrying assembly 200 is deployed to a desired radial position over the disk 100. The slider and head are not shown in FIG. 1 because they would typically be disposed on the disk-facing side of the suspension 230 near the distal end 204 of the head-carrying assembly 200. With the disk 100 spinning in the direction indicated by 120, a flow 125 is induced adjacent to the disk 100.

One of the challenges of disk-drive design is to maintain the head at a very precise location that is preferably a very small fixed distance above the disk. Variations in the height of the head from the disk increase the probability of read/write errors. An exceptional design would hold the head at a fixed height above the disk over a large range of conditions.

Modern disk-drive designs attempt to achieve this goal in part by tailoring the details of the slider. As the disk spins, the air adjacent to the disk is induced to rotate 10 substantially with the disk, as is shown in FIG. 1. Only the flow deflected by the head-carrying assembly 200 and the flow near the outside diameter of the disk 100 deviate much from the substantially solid-body rotation of the flow. The slider flies in the induced flow. The aerodynamic forces generated on the slider are balanced by the suspension to which the slider is attached. A balance between the aerodynamic forces on the slider and the restoring elastic forces imposed by the suspension is required to maintain the slider, and hence the head, at the desired fly height. However, as the head-to-disk spacing reduces further in the near future, the slider may contact with disk asperities or the disk surface itself. In such circumstances the force balance is more complex and must include the aerodynamic forces generated on the slider, the elastic forces imposed on the slider by the suspension, and the contact and frictional forces imposed on the slider by the disk contacts and friction. In addition, during data accessing, the slider is quickly moved radially by the action of the actuator. This imposes a radial inertial force to the slider and is balanced by forces generated by changing the flying attitude of the slider. To design a slider that minimizes this data accessing fly height variation is challenging.

All currently used sliders are designed so that in the induced flow, the leading portion of the slider is lifted away from the disk slightly more than the trailing portion of the slider. This type of slider has positive pitch. In a slider with positive pitch, the head is located in the trailing portion of the slider, i.e., in that portion of the slider that is closest to the disk. For disk drives with conventional flow, wiring is simplified with the location of the head in the trailing portion of the slider.

SUMMARY OF THE INVENTION

The current invention explores a new paradigm for the design of sliders used in disk drives. Rather than continuing to design sliders with positive pitch, the current invention includes sliders that are designed to fly with negative pitch. Such designs are typified by having at least one point in the leading portion of the slider closer to the disk than any point in the trailing portion of the slider when the slider is flying in the flow induced by the spinning disk.

Another way to imagine a negatively pitched slider is to consider a ray from a first point in the trailing portion of the slider through a second point in the leading portion of the slider. The first and second points are chosen such that in the absence of flow, the ray would be parallel to the disk, but in the presence of flow, the ray intersects the plane of the disk surface. This occurs if the flow tilts or pitches the trailing portion further from the disk than the leading portion.

Tests indicate unexpected benefits from the use of the negatively pitched slider. The negatively pitched slider has reduced fly height sensitivity to ambient pressure variations and to radial location over the disk. In addition, during data accessing, the negatively pitched slider experiences a reduced drop in fly height relative to a positively pitched slider. Therefore, flying a slider such that a point on the slider closest to the disk is located on the leading portion of the slider is useful for achieving reduced head altitude sensitivity to ambient pressure and radial position, and reduced fly height variation during data accessing.

Because the head is usually located near the point of closest approach to the spinning disk, most embodiments of a negatively pitched slider will have the head coupled to a head pad in the leading portion of the slider. Although having the head in the leading portion of the slider complicates the wiring in disk drives with conventional flow, it simplifies the wiring in reverse-flow disk drives. Large reductions in head vibration and fly height variation have been observed when a negatively pitched slider is used in combination with reverse flow.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate a complete embodiment of the invention according to the best modes so far devised for the practical application of the principles thereof, and in which:

FIG. 6A shows a plan view of a slider and a suspension. The view is from the disk.

FIG. 6B shows a cross section of the slider and suspension of FIG. 6A.

DETAILED DESCRIPTION OF PREFERRED EMBODIMENTS

Figure 2A:
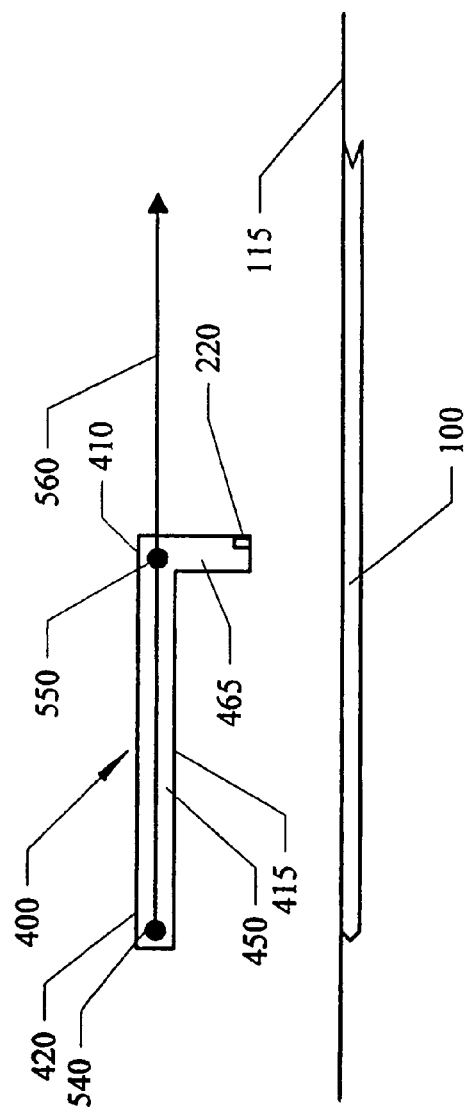
FIG. 2A shows a simplified slider over a disk.
Figure 2B:
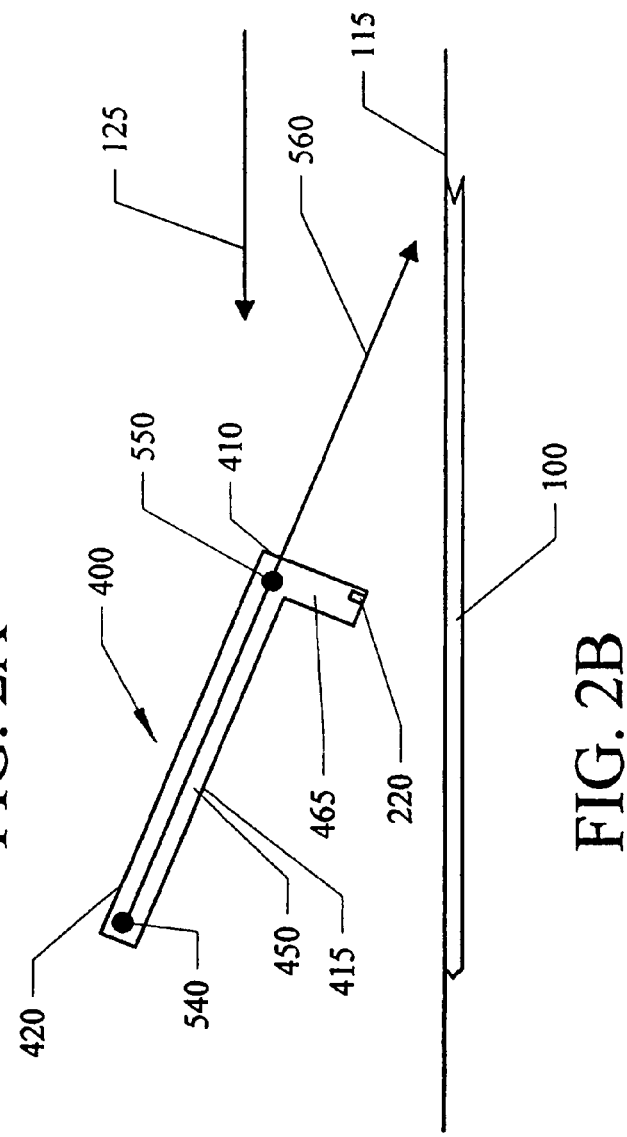
FIG. 2B shows that the simplified slider is negatively pitched in the presence of flow.

Referring now to the drawings, where similar elements are numbered the same, FIGS. 2A and 2B depict an embodiment of a very simplified slider 400 that has negative pitch in the presence of flow 125. FIG. 2A illustrates the orientation of the slider 400 relative to the disk 100 without flow. FIG. 2B illustrates the orientation of the slider 400 relative to the disk 100 with flow 125.

The slider 400 has a leading portion 410 and a trailing portion 420. The leading portion 410 is upstream of the trailing portion 420 in the presence of the flow 125. For exactness, every part of the slider 400 can be considered as being disposed in either the leading portion 410 or the trailing portion 420.

The direction of the flow 125 relative to the slider 400 varies slightly with the slider's position over the disk 100. Therefore, the slider leading 410 and trailing 420 portions are to be determined for the case in which the slider 400 is located at the midpoint of the design range of use of the head 220 supported in the slider 400. For instance, if the head 220 in the slider 400 were designed to operate from the disk inner diameter to the disk outer diameter, then the midpoint would be halfway between the disk inner and outer diameters. The parking position and other positions that the slider 400 may occupy when the head 220 is not in use should not be used in the computation of the midpoint.

To eliminate uncertainty in the use of the term "upstream," a body A is defined to be upstream of a body B if the time required for a flow disturbance generated at body A to be observed at body B is less than the time required for a flow disturbance generated at body B to be observed at body A. This definition is intended to reduce to the usual meaning of upstream in the case of bodies at rest in a uniform linear flow.

In preferred embodiments of the invention, the slider 400 includes a base 450, a head pad 465 that projects from the base in the leading portion 410 of the slider 400, and a head 220 that is coupled to the head pad 465. Although in most preferred embodiments the head 220 is an integral part of the slider 400, the invention also includes embodiments in which the head 220 is more loosely coupled with the head pad 465. The head pad 465 is a projection from the base 450 that supports the head 220. The head pad 465 typically includes leads for electrically coupling the head 220 with traces or conduction leads outside of the slider 400.

In prior art sliders, the head pad is located in the trailing portion of the slider. In the most preferred embodiments of the invention, not only does the head pad 465 project from the base 450 in the leading portion 410 of the slider 400, but the head pad 465 is disposed in approximately the most upstream portion of the slider 400.

In preferred embodiments of the invention the base 450 of the slider 400 has a disk-facing side 415 that faces the disk 100. At least one projection projects from the disk-facing side 415 of the base 450. In FIGS. 2A and 2B, the head pad 465 is the only projection. In alternate embodiments other projections are included either with, or in place of the head pad 465. The base 450 and the projections are arranged such that in the presence of the flow 125, at least one point in the leading portion 410 of the slider 400 is closer to the disk 100 than any point in the trailing portion 420 of the slider 400. This is clearly the case in FIG. 2B, in which the flow 125 is included. In the most preferred embodiments, the most upstream position on the slider 400 is closer to the disk 100 than any point in the trailing portion 420 of the slider 400.

Preferred embodiments of the negatively pitched slider can also be described with the use of a ray 560 that extends from a first point 540 in the trailing portion 420 of the slider 400 through a second point 550 in the leading portion 410 of the slider 400. The points are selected such that in the absence of flow, the ray 560 is parallel to the disk plane 115 that is defined by the surface of the disk 100 as shown in FIG. 2A. Although FIG. 2A shows the ray 560 as substantially parallel to the base 450, this condition is not necessary. The orientation of the ray 560 relative to features in the slider 400 can vary greatly with different embodiments. In the presence of flow 125, as shown in FIG. 2B, the ray 560 intersects the disk plane 115.

The angle of the pitch of the slider 400 relative to the disk 100 shown in FIG. 2B is sufficiently steep for the ray 560 to intersect the disk 100 itself. Preferred embodiments have pitch angles ranging from tens to hundreds of microradians, approximately a few hundredths of a degree. Therefore the intersection of the ray 560 with the disk plane 115 that is defined by the surface of the disk 100 is likely to occur at a radial position outside that encompassed by the physical disk 100.

Figure 3:
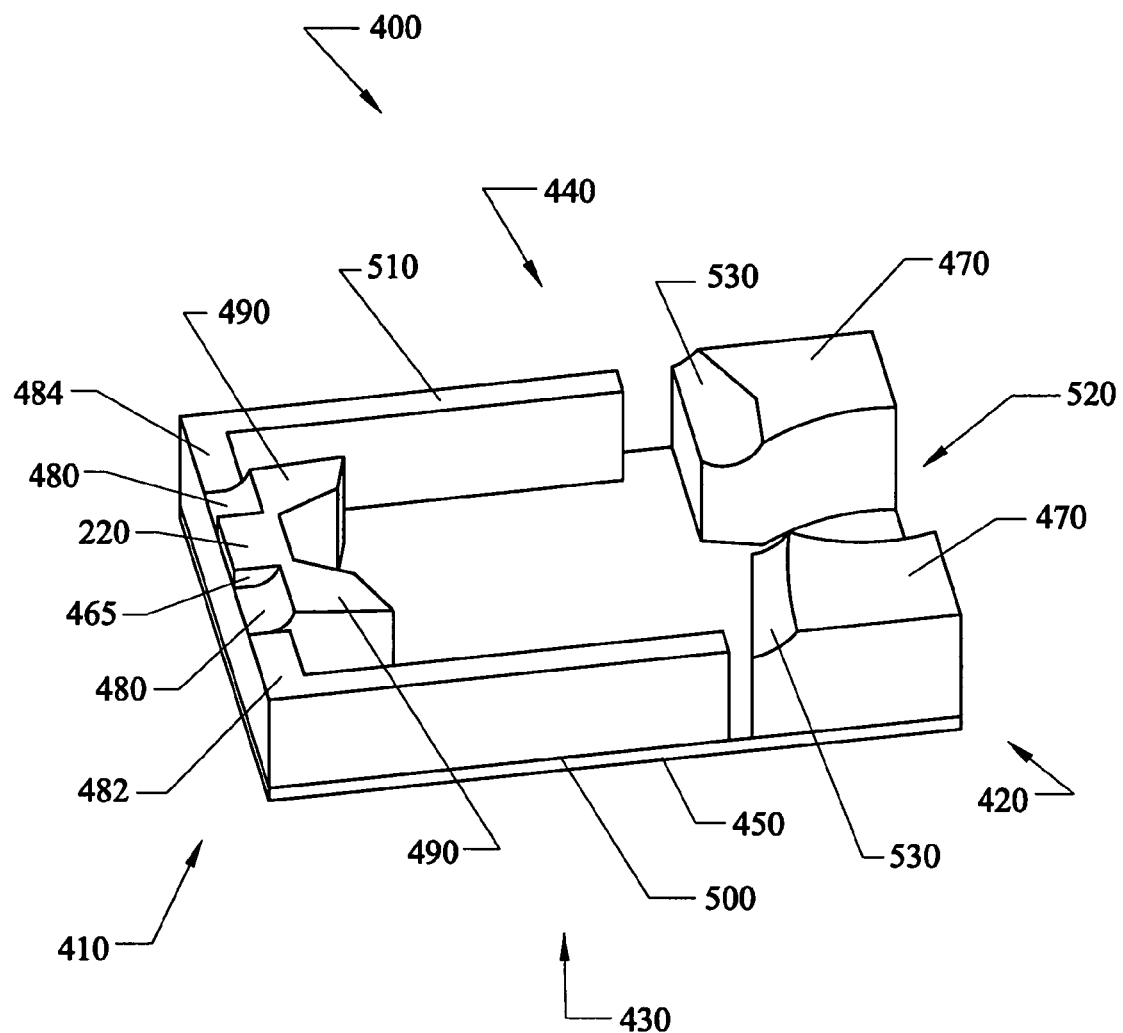
FIG. 3 shows a perspective view of a preferred embodiment of a negatively pitched slider.

A preferred embodiment of a slider 400 designed for negative pitch is illustrated in FIG. 3. The slider 400 includes multiple projections that emerge from the base 450. These projections are arranged such that in the presence of flow from left to right the slider 400 pitches so that the downstream portion 420 becomes relatively further from the disk 100 than the upstream portion 410.

The particular embodiment shown in FIG. 3 is designed with the outer-diameter side 440 at the top of the figure and the inner-diameter side 430 at the bottom of the figure. The inner-diameter side 430 will be closer to the center of the disk. The asymmetry between the inner-diameter side 430 and the outer-diameter side 440 alleviates problems associated with the nonuniform flow environment. Without accounting for the influence of the slider 400 and its associated head-carrying assembly, the flow induced by the disk is substantially in solid body rotation. Therefore the flow speed at the inner-diameter side 430 of the slider 400 is somewhat slower than that at the outer-diameter side 440. The asymmetric design accounts for these different flow speeds and flow directions when the slider 400 is placed at the different radial positions.

The preferred embodiment shown in FIG. 3 includes a head pad 465 in the leading portion 410 and two trailing high-pressure pads 470 in the trailing portion 420. A trailing-portion outflow region 520 between the two trailing high-pressure pads 470 allows flow to escape the confines of the slider 400. Although not necessary in all embodiments, the relatively large size of the trailing-portion high-pressure pads 470 is useful for lifting the trailing portion 420 of the slider 400 more than the leading portion 410. The term "pad" as used herein is intended to include the surface of the described projection, as well as its underlying structure down to the base 450.

FIG. 3 also shows leading-portion compression pads 480 in the leading portion 410 of the slider 400. In addition, trailing-portion compression pads 530 are located just upstream of the trailing-portion high-pressure pads 470. Compression pads do not project as far from the base 450 as their adjacent high-pressure pads. Although not required, compression pads are generally intended to compress the flow just upstream an adjacent high-pressure pad.

Figure 4:
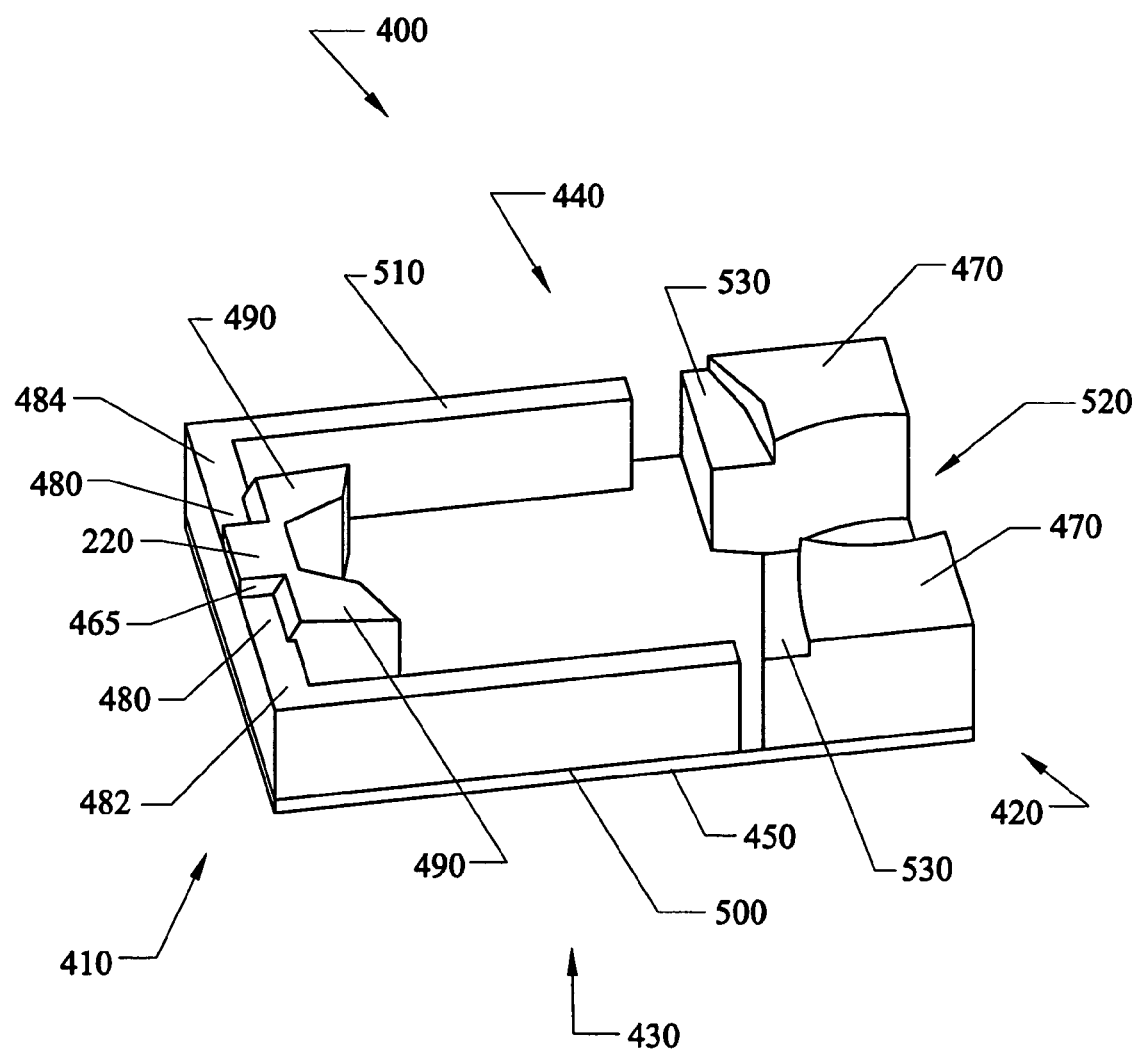
FIG. 4 shows a perspective view of another preferred embodiment.

In FIG. 3, the leading-portion compression pads 480 and the trailing-portion compression pads 530 are each shown with a curved portion to smoothly compress the flow. An alternative embodiment, shown in FIG. 4, is similar in many respects to that shown in FIG. 3, except that the compression pads do not include a curved (or slanted) portion. The designer makes the decision to use or not use a slanted portion, or even a curved portion of the compression pads after consideration of many factors, including performance and production costs.

The embodiments shown in FIGS. 3 and 4 also include high-pressure nose pads 490 adjacent to the leading-portion compression pads 480. The high-pressure nose pads 490, the trailing-portion high-pressure pads 470, and the head 220 supported by the head pad 465 are all preferably about the same height above the base 450. These projections typically experience the highest pressures.

The preferred embodiment shown in either FIG. 3 or 4 includes an inner-diameter rail 500 disposed nearto the inner-diameter side 430 of the slider 400 and an outer-diameter rail 510 disposed nearto the outer-diameter side 440 of the slider 400. As shown in the figures, the inner-diameter rail 500 joins with the inner-diameter segment 482 of the leading-portion compression pad 480 and the outer-diameter rail 510 joins with the outer-diameter segment 484 of the leading-portion compression pad 480. The joined projections form a partial enclosure. Inside the enclosure the exposed base 450 of the slider 400 experiences subambient pressure. The rails and the compression ramps typically extend approximately the same distance from the base 450. Of course, if slanted portions of compression ramps are included, they will have variable height about the base 450.

Negatively pitched sliders may include any or all of the various projections described above in any combination that satisfies the design objectives. In addition, although current manufacturing considerations strongly favor sliders with rectangular planforms, a negatively pitched slider with some other planform shape, such as a circle, oval, or ellipse are also considered part of the invention. Similarly, although the slider base 450 has been shown as flat in the preferred embodiments, a contoured base 450 would also be considered as part of the invention.

In the most preferred embodiments the slider is made from an aluminum-titanate ceramic substrate. The head is typically encapsulated in alumina. Other appropriate materials may be used for either the head or the slider.

The most preferred embodiments are manufactured in a manner similar to that used for a pico slider. In a typical production process of a pico slider the head layers are deposited to a thickness of about 0.035 mm on a wafer that is about 1.21 mm thick. The total wafer thickness plus head now equals about 1.25 mm, which corresponds to the slider length. The wafers are diced into rows, turned on their sides, mounted in carriers and etched. The etching leaves elevated structures, which form the various pads, rails and other projections that emerge from the base. Although particular embodiments can vary greatly in the etch depths for each projection, in a typical preferred embodiment, the head and the high-pressure pads have approximately equivalent heights from the base and are not etched. Also in a typical preferred embodiment, the compression pads and rails are made with a shallow etch of about 0.2 to 0.3 microns and the base is reached with a deep etch that typically ranges from about 1 to 3 microns. Final dicing produces finished sliders.

Figure 1:
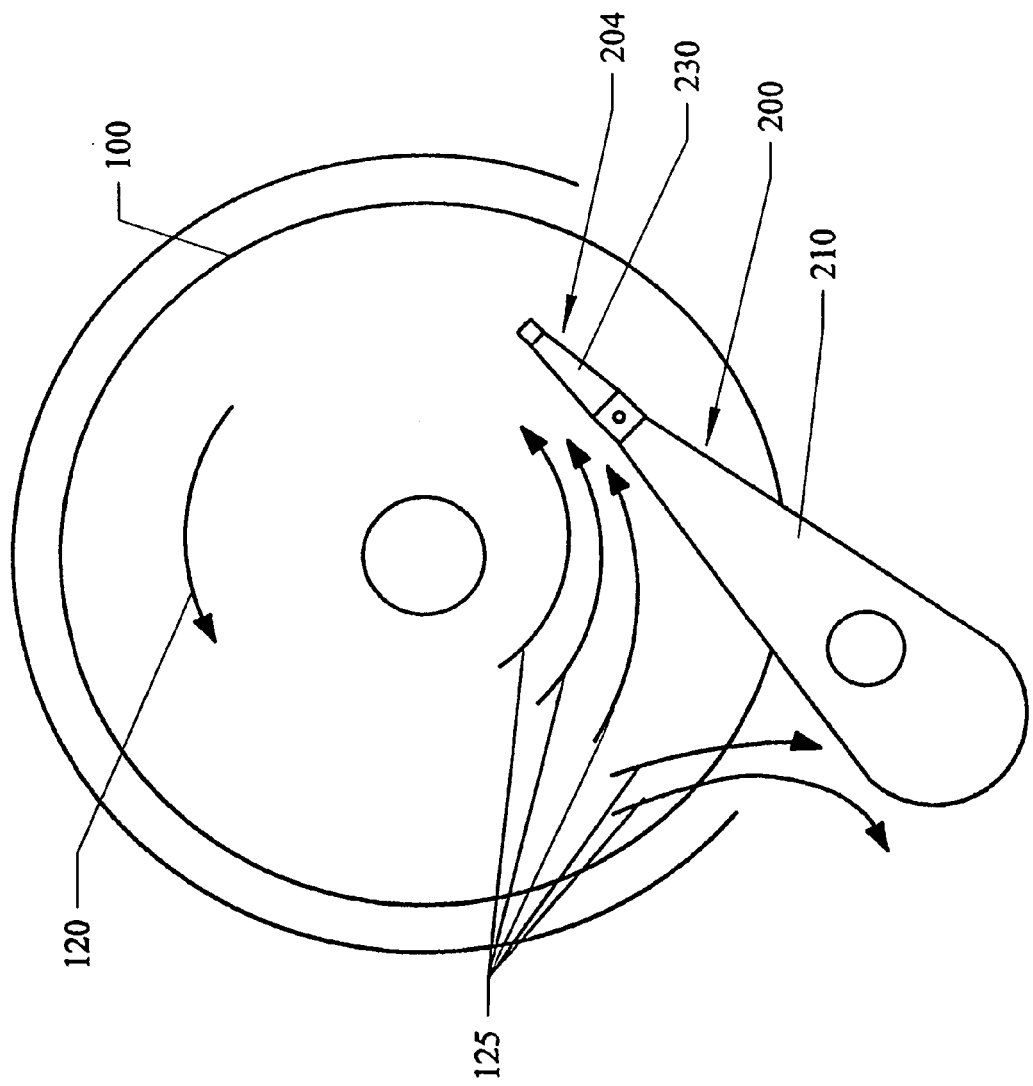
FIG. 1 shows a disk drive with conventional flow.
Figure 5:
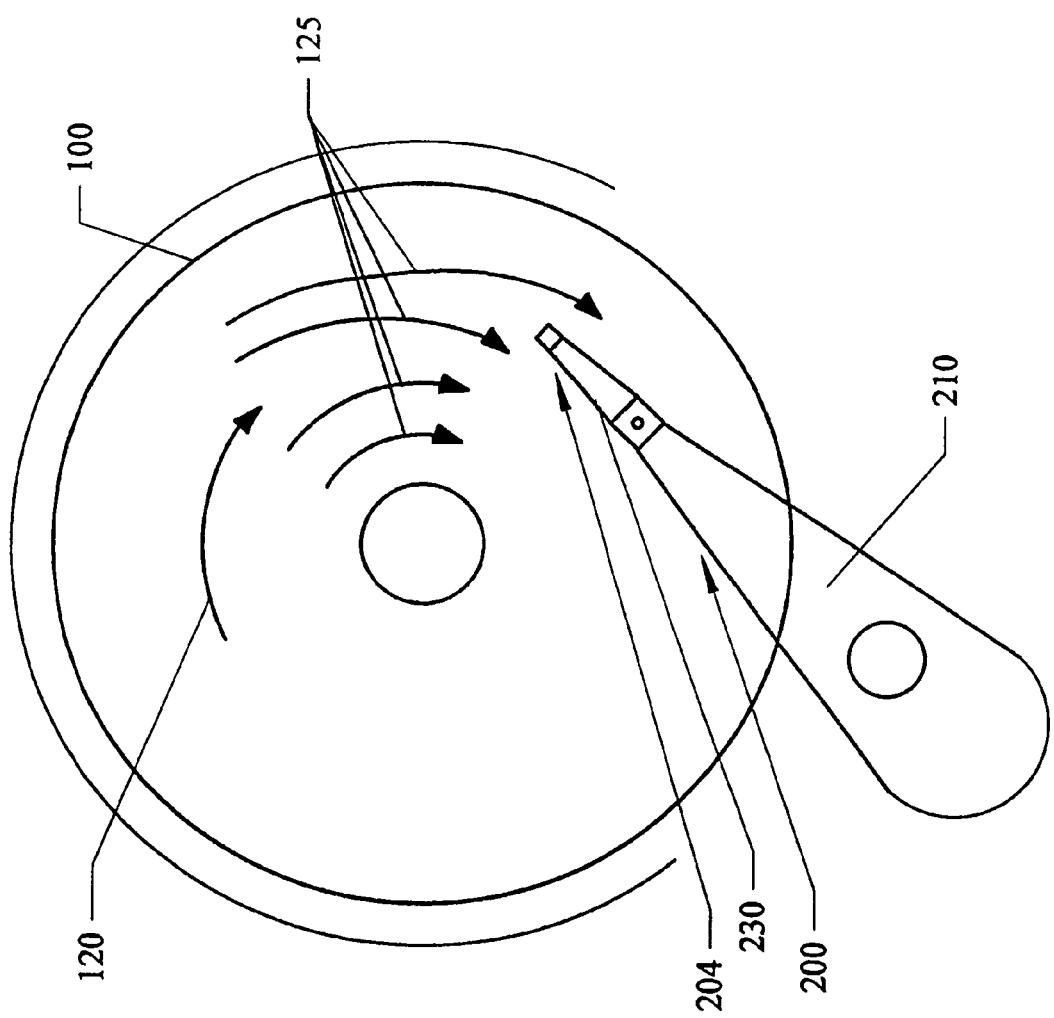
FIG. 5 shows a disk drive with reverse flow.

A negatively pitched slider has been found to achieve reduced head altitude sensitivity to ambient pressure and radial position over a spinning disk. This is accomplished by flying a slider in the induced flow produced over the spinning disk such that a point on the slider closest to the disk is located in on the leading portion of the slider. The reduced altitude sensitivity is achieved both for conventional-flow disk drives, as shown in FIG. 1, and reverse-flow disk drives, as shown in FIG. 5. In the conventional-flow disk drive, the disk 100 is spinning in a direction 120 so that, relative to the induced flow 125, the slider is downstream of the actuator arm 210. In the reverse-flow disk drive the disk 100 is spinning in a direction 120 so that, relative to the induced flow 125, the slider is upstream of the actuator arm 210. For a given conventional-flow disk drive, a reverse-flow disk drive is obtained by either spinning the disk in the opposite direction or by reorienting the head-carrying assembly. Both approaches are equivalent.

To better appreciate the use of a negatively pitched slider in a disk drive, consider both the conventional-flow disk drive of FIG. 1 and the reverse-flow disk drive of FIG. 5. In both cases, the disk drive includes a disk 100 that spins, in a spinning direction 120, thereby inducing a flow 125 that rotates substantially with the disk 100. The disk drive also includes a head-carrying assembly 200 deployable adjacent to the disk 100. The head-carrying assembly 200 has an actuator arm 210, a suspension 230 attached to the actuator arm 210, and a slider (not shown in FIGS. 1 and 5, because it would be obscured by the suspension 230.)

FIG. 6A shows a plan view of a slider 400 fixed to an embodiment of a suspension 230. The view is of the disk-facing side of the suspension 230. FIG. 6B shows a cross-section view of the suspension 230 and slider 400 shown in FIG. 6A. Note that the slider 400 has a leading portion 410 and a trailing portion 420. The leading portion 410 is upstream of the trailing portion 420 in the presence of flow. The relative positions of the leading 410 and trailing 420 portions in FIGS. 6A and 6B correspond to the conventional-flow disk drive shown in FIG. 1, wherein the slider is disposed downstream of the actuator arm 210. For the reverse-flow disk drive shown in FIG. 5, wherein the slider is disposed upstream of the actuator arm 210, the leading 410 and trailing 420 portions of the slider 400 would be reversed from that shown in FIGS. 6A and 6B.

For either the conventional-flow disk drive or the reverse-flow disk drive, in the presence of flow, embodiments of the negatively pitched slider have at least one point in the leading portion 410 of the slider 400 closer to the disk 100 than any point in the trailing portion 420 of the slider 400.

The reverse-flow orientation is preferred when using a negatively pitched slider. With reference to FIGS. 6A and 6B, a suspension 230 typically includes a load beam 300 that would be attached to the actuator arm, and a flexure 350 that is mounted to the load beam 300. The flexure 350 includes flexure legs 390 that support a gimbaled region 370 to which the slider 400 is fixed. Typically an adhesive process fixes the slider 400 to the gimbaled region 370 of the suspension

230. In alternate embodiments, appropriate other methods for fixing the slider 400 to the gimbaled region 370 may be used. The gimbaled region 370 allows the slider 400 to pitch and roll in response to surface nonuniformities as it flies over the disk. The flexure legs 390 provide a restoring force that counteracts the slider 400 motions. Preferably, the suspension 230 and slider 400 are designed so that the proper resiliency of the gimbaled region 370 is maintained in all operating conditions. This has implications for the routing of traces, or conduction leads to the head.

Figure 7A:
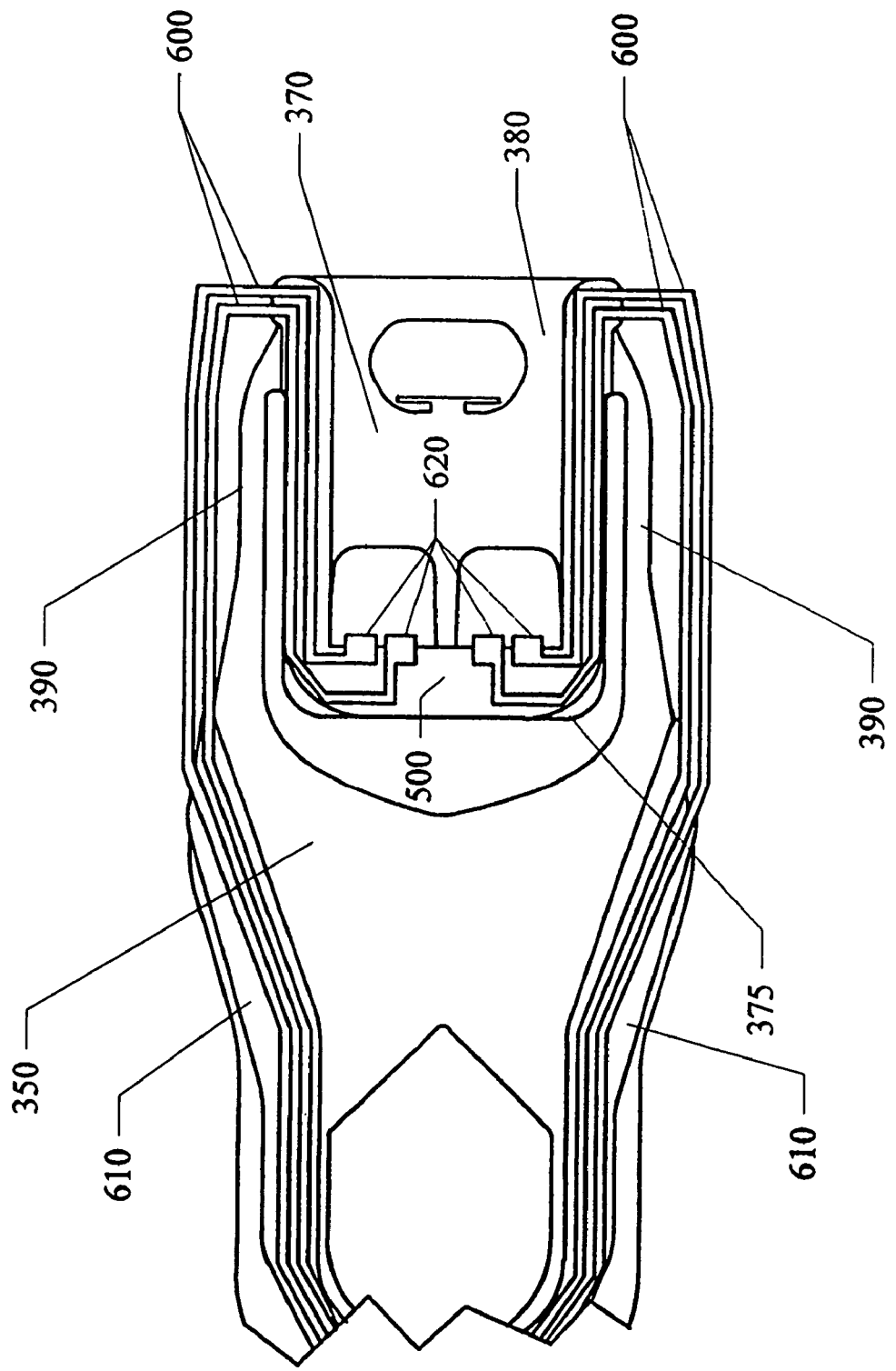
FIG. 7A shows a portion of a flexure with traces for a negatively pitched slider in a conventional-flow configuration.

Referring to FIG. 7A, because the flexure 350 is metallic in most embodiments, the traces 600 are not bonded directly to the flexure 350. Instead, an insulator 610, (typically a polyimide layer) is bonded to the flexure 350 and the traces 600 are laid thereon. To reduce any influence of the traces 600 and the insulator 610 on the flexibility of the gimbaled region 370, the traces 600 are often routed alongside the flexure legs 390 to the distal end 380 of the gimbaled region 370. The use of a negatively pitched slider with a conventional-flow disk drive means that the leading portion of the slider (410 in FIGS. 6A and 6B) is near the proximal end 375 of the gimbaled region 370. The head is usually disposed in the leading portion of a negatively pitched slider. Hence, in this configuration preferably the traces 600 are routed from the distal end 380 of the gimbaled region 370 to the proximal end 375 of the gimbaled region 370 where they connect to mounting pads 620. The mounting pads 620 are then soldered to appropriate terminals on the slider.

Figure 7B:
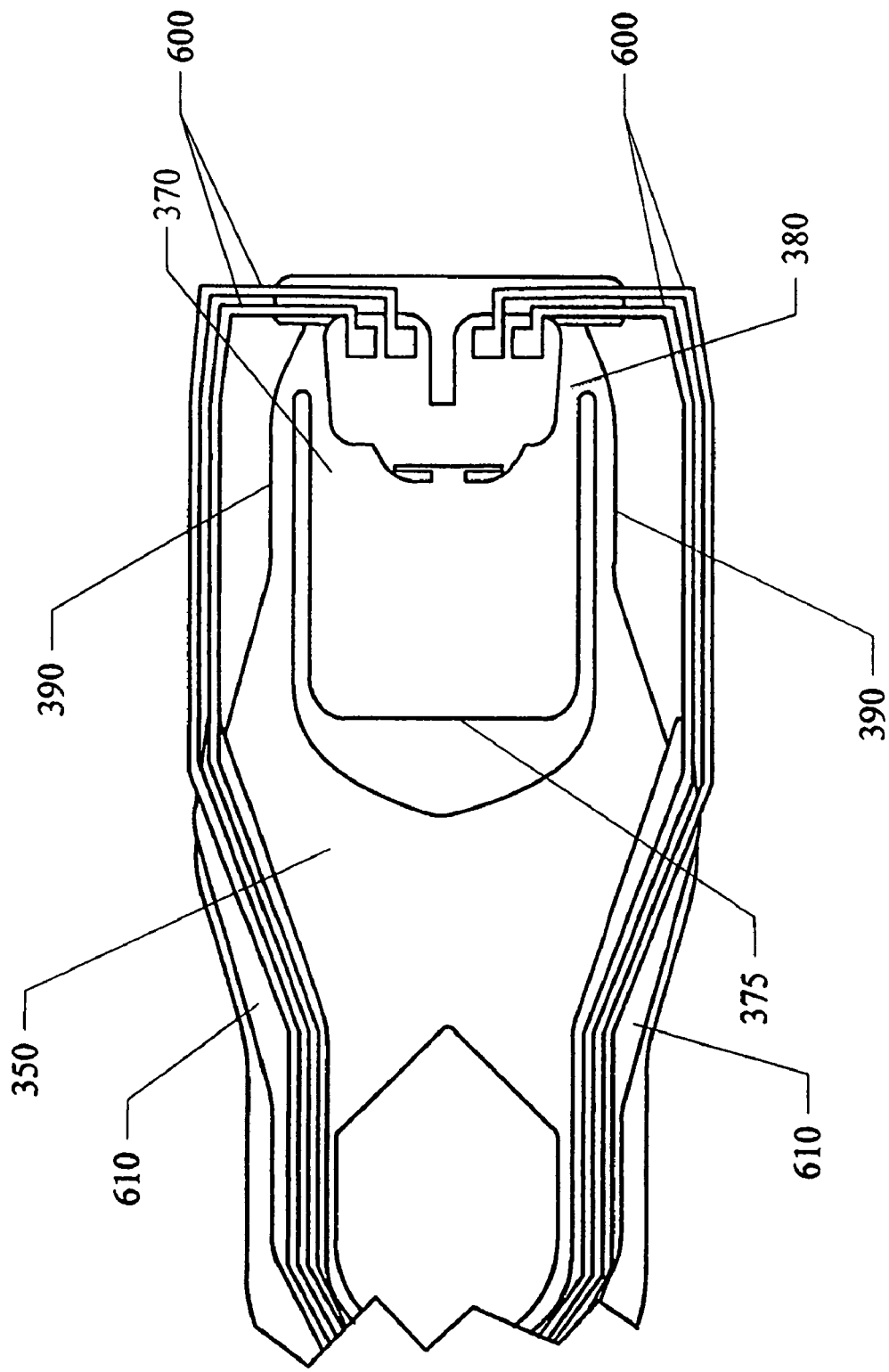
FIG. 7B shows a portion of a flexure with traces for a negatively pitched slider in a reverse-flow configuration.

With reference to FIG. 7B, if a negatively pitched slider is used in a reverse-flow disk drive, the routing of the traces 600 becomes simpler. In a reverse-flow disk drive, the leading portion of the slider would be located near the distal end 380 of the gimbaled region 370. Because the head would typically be located in the leading portion of the slider, the electrical connections to the slider can be made near the distal end 380 of the gimbaled region 370. In addition to simplifying the routing of the traces 600, the gimbaled region 370 can be made narrower because it no longer supports traces 600 extending from its distal end 380 to its proximal end 375. The combination of a reverse-flow disk drive with negatively pitched sliders greatly reduces head vibrations. When used in combination, the routing of the traces is no more difficult than a conventional-flow disk drive with positively pitched sliders.

The above description and drawings are only illustrative of preferred embodiments, and the present invention is not intended to be limited thereto. Any modification of the present invention that comes within the spirit and scope of the following claims is considered part of the present invention.

What is claimed is:

1. A disk drive, comprising:
   a disk that spins, thereby inducing a flow that rotates substantially with the disk; and
   a head-carrying assembly deployable adjacent to the disk, the head-carrying assembly comprising:
   an actuator arm,
   a suspension attached to the actuator arm, and
   a slider fixed to the suspension, the slider having a leading portion and a trailing portion, the leading portion being upstream of the trailing portion in the presence of the flow, the slider comprising:
   a head pad in the leading portion,
   a head coupled to the head pad,
   a base having a disk-facing side that faces the disk, and
   at least one projection from the disk-facing side of the disk;
   wherein, in the presence of the flow, at least one point in the leading portion of the slider is closer to the disk than any point in the trailing portion of the slider.

2. The disk drive, according to claim 1, wherein the head-carrying assembly is oriented such that relative to the flow, the slider is disposed upstream of the actuator arm.

3. The disk drive, according to claim 1, wherein the head-carrying assembly is oriented such that relative to the flow, the slider is disposed downstream of the actuator arm.

* * * * *

UNITED STATES PATENT AND TRADEMARK OFFICE
CERTIFICATE OF CORRECTION

PATENT NO. : 6,965,498 B2
DATED : November 15, 2005
INVENTOR(S) : Payne

It is certified that error appears in the above-identified patent and that said Letters Patent is hereby corrected as shown below:

<u>Column 8,</u>
Line 29, delete "disk" and replace with -- base --.

Signed and Sealed this

Seventh Day of March, 2006

JON W. DUDAS
*Director of the United States Patent and Trademark Office*